CIRCUIT GENERATING TIME-REFERENCE PULSES ON TRAILING-EDGE OF ANALOG-INPUT EMPLOYING DUAL-INPUT PATHS RESPECTIVELY CONTROLLING CHARGING AND DISCHARGING OF CAPACITOR

Filed April 6, 1964

INVENTOR.
HEIN VAN STEENIS
BY
ATTORNEY 3,280,345

CIRCUIT GENERATING TIME-REFERENCE PULSES ON TRAILING-EDGE OF ANALOG-INPUT EMPLOYING DUAL-INPUT PATHS RESPECTIVELY CONTROLLING CHARGING AND DISCHARGING OF CAPACITOR

Hein van Steenis, Amstelveen, Netherlands, assignor to International Business Machines Corporation, New York, N.Y., a corporation of New York Filed Apr. 6, 1964, Ser. No. 357,441

Claims priority, application Netherlands, May 3, 1963, 292,336

11 Claims. (Cl. 307—88.5)

The invention relates to electronic circuits for supplying a time reference pulse in response to an applied analog pulse.

The term reference pulse is construed hereinafter as a pulse with steep leading edge, which consequently provides a sharply defined time indication. The term analog pulse is construed hereinafter as a pulse with relatively widely spaced edges. Generally such pulses have a rather flat top and among each other show peak level variations. Such pulses often have extra diverging edges at the base. Examples of this are a half period of a sine wave, or a half period of a squared sine wave. In technology such analog pulses are present, for example, in scanning or transmission processes.

If in optical character recognition a sharp black-white transition is to be scanned, the scan signal obtained still has a finite rise time, in consequence of the diameter of the scanning light spot or the width of the scan slot. Moreover, the black-white transition itself, for example the side edge of a type character, may not be clear and sharply defined in consequence of imperfections of paper and impression. These limitations and imperfections will partly result in a widening of the pulse. Minor noise waves or spikes may result because of small blots, ink specks or white spots within the impression. Also, upon scanning a magnetic mark on a record carrier an analog pulse develops, on account of the finite width of the scan slot, and the continuity of the magnetic leakage field. Also, here there is noise present in consequence of magnetic imperfections of the registration, for example, unequal distribution of the magnetic material in the oxide layer or in the printing ink.

Upon transmission of a signal pulse of definite shape a widened pulse will be received in consequence of distortion in the transmission medium. Also, here interfering noise will be superimposed on the signal received.

Owing to the circumstances described before it is a problem to extract the information contained in the appearance of the analog pulse. As a result of the widely spaced pulse edges and the flat top, the exact time of the analog pulse is difficult to determine. Detection on the top is inaccurate and is relatively strongly interfered with by noise spikes. It is true that cutting off the pulse below a threshold value and detecting the time when this threshold is exceeded will eliminate the widened base, but there will be difficulties if the analog pulses show great peak value variations. For, weak signal pulses are almost entirely cut off so that detection takes place near the top; very strong signal pulses are almost entirely passed, so that detection is effected on a relatively low part of the edge, far from the top. The pulse detection times thus obtained are not equivalent.

This problem is encountered in practice, for example, when in automatic character recognition, characters printed on a document are encountered, which characters have been applied at different times by means of different printing processes, some possibly with considerably more contrast than others. Furthermore, within a single printed character it is the charatcer shape itshelf that is a cause of the occurrence of scan pulses of different amplitude or peak value.

To solve this problem the detection circuit for generating reference pulses in response to analog pulses according to the invention is characterized in that the signal input is connected, by way of separate signal paths with the base electrodes of two transistors, the emitters of which are connected with the same unilaterally grounded capacitor, and that one of said signal paths comprises an attenuator to attenuate the signal to a predetermined fraction, in consequent of which the transistor controlled by the attenuated signal charges the capacitor to the predetermined fraction of the peak voltage of the pulse during the leading edge of an analog pulse, whereupon this transistor stops passing current, and that subsequently the second transistor, which is controlled by the unattenuated signal via the second signal path, becomes presently conductive for generating an output reference pulse with a steep leading edge, when the edge of the analog pulse has passed the predetermined fraction of the peak voltage.

Detection of an edge of the analog pulse when this edge passes a predetermined fraction or percentage of the peak value provides a much more sharply defined criterion than peak detection and detection times that compare better than with the previously mentioned detection upon exceeding a fixed threshold value. The peak level fraction at which detection takes place is continuously adjustable in a broad region, for example, from 10 to 90 percent. This value can be most favorably selected from the steepest gradient of the pulse edge. The influence of noise spikes superimposed on the pulse shape is then at a minimum.

Other objects, characteristics and advantages of the invention will appear from the following specification, with reference to the drawing in which.

Figure 1:
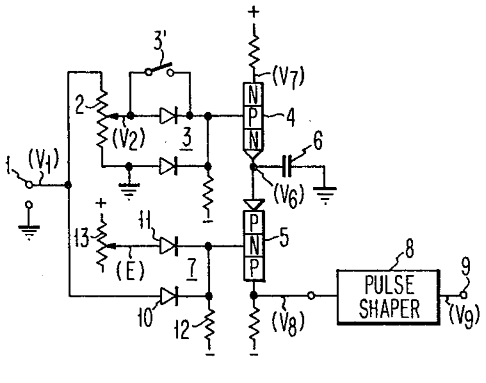
FIG. 1 shows an embodiment for detection on the trailing edge of an analog pulse.

An embodiment of the invention is shown in FIG. 1. This circuit serves for the detection of positive going analog pulses and provides a sharply defined output pulse at the time the trailing edge of an analog input pulse has passed a predetermined fraction of the peak value.

Signal input terminal 1 is connected with the base electrode of NPN transistor 4 by way of an adjustable potentiometer 2, attenuating the signal, and a diode gate 3. The emitter electrode of this transistor is connected with a plate of a capacitor 6, the other plate of which is grounded. A second path, by way of another diode gate 7, connects the input 1 with the base of the PNP transistor 5, the emitter of which is connected with the same capacitor 6. The collectors of the transistors 4 and 5 are each connected by means of current limiting resistance with a suitable energizing potential. In addition, the collector of the transistor 5 is connected through some well known circuit 8 to improve the pulse shape, for example a limiting amplifier, or a trigger circuit, to an output terminal 9. When, as will be described later, a reference pulse with a steep leading edge occurs at the collector of the transistor 5, the pulse shaper 8 converts this pulse into a pulse of prescribed shape, for example a rectangular pulse, so that in this way a standardized reference pulse is obtained, suitable for application to data processing circuits.

The diode gate 7 comprises two diodes 10 and 11 and a resistor 12, connected as shown in FIG. 1. The diode 10 receives the input signal, while the diode 11 receives a positive voltage E from a potentiometer 13. At any moment the one of diodes 10 and 11 receiving the more positive voltage will conduct. Therefore, the higher of the two applied voltages is always present at the output of the diode gate 7, which is the junction of the diodes 10 and 11 and resistor 12, both voltage inputs being always isolated from each other by a non-conducting diode. Therefore, due to the operation of the diode gate 7 a control signal to the transistor 5 is limited downwards by the positive threshold voltage E.

In the other signal path the diode gate 3 operates in similar fashion. The diode gate 3 likewise consists of two diodes connected with a resistor. The potentiometer 2 supplies a predetermined fraction of the input signal to a diode of the gate 3, the other diode being grounded. Due to the operation of the diode gate 3 the attenuated signal, fed as a control voltage to the transistor 4, is limited downwards at 0 volts, so that negative signal components have been eliminated therefrom.

In the rest or idling state, so long as no positive analog pulse appears at signal input 1, the control voltage of the transistor 4 is equal to zero, that of the transistor 5 being equal to E. The voltage of the capacitor 6 will have a value between 0 and E, and neither transistor will conduct. When a positive going analog pulse appears the signal wave attenuated by the potentiometer 2 is passed by the gate 3 to the base of the transistor 4 as described. As soon as this control voltage rises sufficiently above the voltage of the capacitor 6, the transistor 4 becomes conductive. The current through the transistor 4 will be accumulated in the capacitor 6, as the transistor 5 remains cut off. The voltage of capacitor 6 immediately follows the control voltage rise of the transistor 4.

The transistor 5 cannot conduct when the transistor 4 is conducting during the leading edge of the analog pulse. The control voltage of the transistor 5 is equal to the unattenuated input signal or the threshold voltage E, depending on which of the two is higher, so that the control voltage is always higher than the attenuated input signal controlling the transistor 4. The two transistors being of complementary types and having the same emitter voltage, simultaneous conduction would require the NPN transistor 4 to receive a higher control voltage than the PNP transistor 5. This condition can never be satisfied, due to the diode gate 7 keeping any negative input pulses away from the transistor 5. In fact, it is not necessary to isolate the attenuated negative pulses from the transistor 4; consequently, the diode gate 3 could be omitted if desired, which has been indicated in FIG. 1 by the switch 3' between the attenuator 2 and the transistor 4, for by-passing the gate 3.

When the analog pulse has reached its peak value, the attenuated pulse, and likewise the voltage on the capacitor 6, have risen to the predetermined fraction of the peak value. The transistor 4 is now cut off because the control voltage on the base no longer rises above the emitter voltage. On the trailing edge of the analog pulse both transistors 4 and 5 are initially cut off and the voltage on the capacitor is constant. However, when the trailing edge of the unattenuated signal pulse controlling the transistor 5 has fallen below the capacitor voltage, the transistor 5 suddenly turns strongly conductive. This will happen more quickly if the predetermined fraction has been selected at the point on the trailing edge of the pulse with the steepest gradient in respect to peak value. The current through the transistor 5 is drawn from the capacitor 6 and the latter is discharged and follows the control voltage of the transistor 5 downwards.

The sudden conduction of the transistor 5 causes the collector to provide a positive going pulse with steep leading edge. This reference pulse is taken by the pulse shaper 8, in which it is further shaped as desired and delivered to the output terminal 9. The shaper 8 can be one singly or repeatedly carrying out a number of operations well known in pulse technology, such as amplifying, differentiating, limiting or clipping, extending, vertical shifting. In so doing the time information contained in the steep leading edge of the pulse must be retained, but other properties of the pulse can be improved or standardized by these operations, so that the pulses can be further processed in circuits of the kind usual in digital data processing machines.

The conduction of the transistor 5 is interrupted when the control voltage has reached the threshold value E and does not decrease further. The circuit has now been reset to the rest or idling state. The capacitor 6 is charged to the voltage E again, but as a result of a small leakage current through the dielectric it may be further discharged after a long time, which is not of importance.

Figure 2:
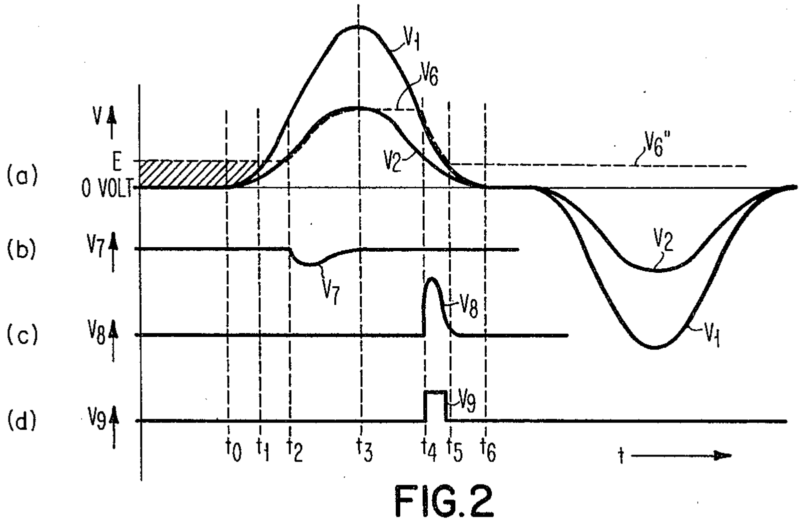
FIG. 2 shows the wave shape of the voltage at different points of FIG. 1.

To illustrate the operation of the circuit the wave shapes of the voltage at a number of points of the circuit have been represented in FIG. 2. To give an example it is assumed that the input signal $V_1$ comprises a positive analog pulse followed by a negative one. Such a signal is obtained, for example, from a magnetic read head, when reading a magnetic mark in a record carrier. Furthermore, it is assumed that the attenuator 2 has been adjusted at an attenuation of 50 percent.

In FIG. 2 the top most curve (*a*) shows the wave shape of the input signal voltage $V_1$, the attenuated signal voltage $V_2$, and the capacitor voltage $V_6$. For clearness the latter has been represented by a dotted line. First $V_6$ is equal to the threshold voltage E or a smaller value, as indicated by the hatched region $V_6'$. At time $t_0$ the positive analog pulse $V_1$ begins to rise, as does the attenuated pulse $V_2$. At time $t_1$, $V_1$ passes the threshold value E, so that the diode gate 7 begins to pass the voltage $V_1$. The diode gate 3 passes $V_2$ and at time $t_2$ the transistor 4 becomes conductive. $V_6$ follows $V_2$ until the peak voltage of the attenuated pulse has been reached at time $t_3$. As $V_2$ begins to fall now the transistor 4 is cut off and $V_6$ is constant. At time $t_4$ the trailing edge of $V_1$ passes the capacitor voltage $V_6$. The gradient of $V_1$ being considerable at this level, the transistor 5 rapidly becomes conductive, so that $V_6$ decreases steeply along with $V_1$. At time $t_5$, $V_1$ passes the threshold value E, so that the transistor 5 is cut off. The capacitor voltage remains constant now and equal to E, as indicated by $V_6''$, or it slowly decreases somewhat further to zero still.

The lower curves (*b*), (*c*) and (*d*) of FIG. 2, respectively show the collector voltage $V_7$ of the transistor 4, the collector voltage $V_8$ of the transistor 5 and the output voltage $V_9$ supplied by the shaper 8 if it comprises a limiting amplifier. $V_7$, $V_8$ and $V_9$ are each drawn in respect of their individual rest level. Pulse $V_7$ during the charging of the capacitor 6 is not used further. The pulse with a steep leading edge $V_8$ is used as a time reference for the appearance of the positive analog pulse $V_1$. The steep rise of pulse $V_8$ corresponds to a sharp angle in the wave shape $V_6$ at time $t_4$. The negative pulse, which later on appears in $V_1$, and appears attenuated in $V_2$, does not cause the circuit to become operative.

From FIG. 2 it can be clearly seen that reference pulse $V_8$ is attended with a decreasing part of $V_6$, beginning at the predetermined fraction of the peak value of the analog pulse and ending at the threshold voltage E. Only those input pulses are detected, for which the reduced peak value is sufficiently above the threshold value E. This minimum condition should be taken into account when adjusting the attenuation by means of the potentiometer 2 and threshold E by means of the potentiometer 13. Furthermore, the selected threshold value E should be of such a magnitude that in the absence of a real signal all noise pulses are kept from the transistor 5, otherwise the circuit would be too unstable and deliver false output signals. It is now easy to see the advantage of the circuit of the invention; if only the minimum condition mentioned before is met, input pulses having great signal level variations can all be detected on the trailing edge of the pulse at a prescribed percentage of their respective peak values. The detection will always be accurate, in consequence of the shap angle in the wave shape of $V_6$ on the one hand, and the relatively small influence of noise spikes on the gradient of the analog pulse on the other. Generally the attenuation will be adjusted at a value between 30 and 70 percent, but more extreme adjustments are allowable as well.

It will be clear that the circuit could be used for the detection of negative going analog pulses, when the polarities of all the transistors, diodes and voltage sources were reversed. An alternative is to invert the signal and to detect this inverted signal by means of the circuit shown. If required the signal is preamplified before being fed to the input diode 11. If the analog signal pulses have a rest level differing from zero volts, a direct current blocking capacitor can be inserted between input terminal 1 and the attenuator 2. If desired an emitter follower circuit can be inserted at various points in the circuit, for impedance matching, as well known in the art. Instead of the adjustably fixed threshold value E a slowly variable positive voltage E′, dependent on the input signal level, can be fed to the diode gate 7, if desired, which voltage has been obtained in a manner as usual in the technology of automatic gain control. It is also possible to extend the diode gate 7 with a further diode 11′, not shown, to which the slowly varying control voltage E′ is fed; the signal passed by the gate is then delimitated downwards by the higher of the two threshold voltages E and E′. These and similar alterations leave the principle of the invention unaffected and will not be further described here, as they will be sufficiently clear to one skilled in the art.

Figure 3:
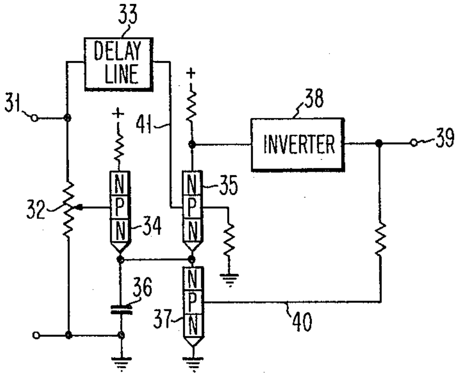
FIG. 3 shows an embodiment for detection on the leading edge of an analog pulse.

FIG. 3 shows the principle of another embodiment of the invention. This circuit detects positive analog pulses on the leading edge, when a predetermined percentage of the peak value is reached. The circuit does not respond to negative input pulses. A corresponding circuit for the detection of negative pulses would be obtained by reversing the polarities of all the circuit elements.

The input terminal 31 is connected to the base of an NPN transistor 34 by way of a potentiometer 32. The input terminal 31 is connected over a second path with the base of an NPN transistor 35 by way of a delay line 33. The emitters of the transistor 34 and 35 are connected with the same plate of a capacitor 36, the other plate of which is grounded. The capacitor is furthermore connected with the collector of a transistor 37, the emitter of which is grounded. The collector of the transistor 35 is connected with the output terminal 39 by way of an inverter 38. The output terminal 39 is connected by a line 40 with the base of the transistor 37.

In the rest or idling state, the capacitor 36 is not charged and the transistors 34 and 35 do not conduct. Consequently, the input level of the inverter 38 is positive. It is assumed that the output of the inverter circuit 38 has a rest level of zero volts. Then the transistor 37 is not conductive. However, as soon as the transistor 35 goes into conduction, as will be described later, the negative going pulse of the collector is inverted by the block 38, to cause a positive pulse, putting the transistor 37 into conduction.

When a positive going analog pulse appears at the input terminal 31, the leading edge of the fractionally attenuated pulse from the potentiometer 32 renders the transistor 34 conductive, so that the capacitor 36 is charged. The capacitor voltage follows the voltage of the leading edge of the attenuated pulse. The transistor 35 retains a control voltage zero, so long as the leading edge of the pulse has not reached the output of the delay line 33.

When the pulse peak appears at the input terminal 31, the transistor 34 is cut off, the control voltage at the base no longer rising above the emitter voltage. The capacitor voltage is now equal to the predetermined fraction of the peak voltage of the pulse, as adjusted by means of the potentiometer 32. So long as the transistors 34, 35 and 37 do not conduct further, the voltage of the capacitor 36 remains constant. If the delay time of the delay line 33 is longer than half the pulse width, it is only now that the leading edge of the delayed pulse begins to appear on the output of the delay line. Initially the transistor 35 remains non-conductive, so long as the leading edge of the delayed pulse has not yet reached the predetermined fraction of the peak voltage. However, as soon as the base voltage of the transistor 35 has risen above the capacitor voltage, the transistor 35 suddenly turns conductive, so that again current flows to the capacitor 36 and the voltage of 36 tends to follow the leading edge of the pulse further upwards. However, at practically the same moment the transistor 37 is put into conduction, in consequence of which the capacitor 36 is quickly discharged, its voltage decreasing sharply. This results again in the emitter voltage of the transistor 35 decreasing along with the capacitor voltage, the control voltage at the base of the transistor 35 increasing further along with the rising leading edge of the delayed pulse. Owing to this positive feedback through the inverter 38, the line 40 and the transistor 37, the voltage drop at the collector of the transistor 35 is very sharp, substantially rectangular.

The steeply rising output pulse on the terminal 39 is an accurate time reference for the moment the leading edge of the delayed pulse has reached the predetermined fraction of the peak value. The conduction of transistors 35 and 37 is interrupted when the delayed pulse has emerged completely from the delay line 33 and its trailing edge approaches the rest level again. Now capacitor 36 is now entirely discharged, all the transistors 34, 35 and 37 are cut off and the circuit is ready for the detection of a new input pulse. It will be clear that the delay time of the line 33 should be at least equal to half the pulse width to render it possible to adjust the detection level at any desired fraction of the peak value. A smaller delay time limits the adjustment region. A condition for good operation is that the transistor 34 be cut off before the transistor 35 becomes conductive, in other words the delayed pulse should not reach the previously set fraction of the peak value until the undelayed pulse has reached its peak value.

Figure 4:
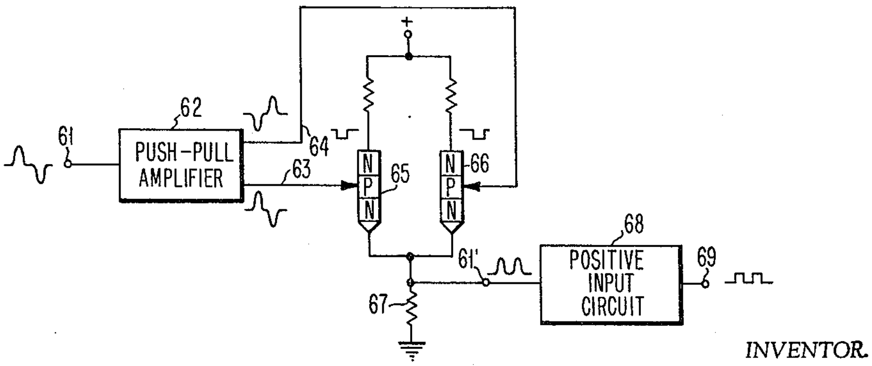
FIG. 4 shows an embodiment for detection of pulses of different polarities.

FIG. 4 illustrates the possibility to detect both positive going and negative going analog signal pulses by means of a detection circuit according to FIG. 1. A signal input terminal 61 is connected to the input of a push-pull amplifier 62. At the output terminals 63 and 64 of the amplifier 62 a true and an inverted version of the signal pulse appears. A pair of transistors 65 and 66 operate as emitter followers, with a common emitter load 67. Across the load appears a rectified version of the pulse signals, which are fed at terminals 61′ to a positive analog pulse detector 68 according to the invention as described before. The signals at the collectors of transistors 65 and 66 provide an indication whether the detected pulse was originally a positive going or a negative going one.

In various circumstances a detection switch according to the invention will offer considerable advantages. When, for example, the width and shape of the analog pulses do not vary, the time of appearance of the analog pulse is accurately detected, on the trailing edge as in FIG. 1 or on the leading edge as in FIG. 3 as desired. The detection accuracy is not distributed by great peak value variations.

When both peak value and pulse width vary, the detection of say a 50 percent level of a pulse edge will provide a reliable indication of the occurrence of the pulse. When two detection circuits are used, it is moreover possible to obtain information about the pulse shape, for example the rise time is determined by detection of the 25 percent and 75 percent levels on the leading edge, or the pulse width by detection of the 50 percent levels on leading and trailing edges. Another possibility is first to differentiate the analog pulse, as a result of which a positive pulse is obtained followed by a negative one. These pulses are then detected, both in the example at 50 percent of their trailing edge.

Applications of the invention are envisaged for example in the detection of scan signals in magnetic or optical character recognition, demodulation of a binary information modulated carrier wave in accordance with the principle of frequency modulation or phase modulation, and electrical measuring technology.

The invention claimed is:

1. A circuit arrangement for producing a time reference pulse in response to an input pulse varying in amplitude and shape comprising,
   a capacitor having two electrodes,
   means connecting one of said electrodes to a point of fixed reference potential,
   a pair of transistors, each having emitter, base, and collector electrodes,
   means connecting the emitter electrodes of both of said transistors to the other electrode of said capacitor,
   means applying direct energizing potential to the collector electrodes of said transistors,
   an attenuator, having input and output terminals,
   means for applying an input pulse signal to the input terminal of said attenuator for deriving a predetermined fraction of said input pulse signal at the output terminal of said attenuator,
   means connecting the output terminal of said attenuator to the base electrode of one of said transistors for charging said capacitor on the leading edge of said input pulse to a value substantially equal to said predetermined fraction of the peak voltage of said input pulse signal, at which value said one transistor ceases conducting, and
   means applying the full input pulse signal to the base electrode of the other of said pair of transistors at which said other transistor begins to conduct at the value of said input signal equaling the charge on said capacitor,
   thereby producing a pulse at the collector electrode of said other transistor indicative of the timing of said input pulse.

2. A circuit arrangement for producing a time reference pulse as defined in claim 1, and wherein
   said pair of transistors are of complementary types,
   for reference on the trailing edge of said input pulse.

3. A circuit arrangement for producing a time reference pulse as defined in claim 2, and incorporating
   an OR gating circuit interposed in the lead to the base electrode of said other transistor, and
   means to apply a predetermined threshold potential to said OR gating ciriuit,
   for limiting conduction of said other transistors to input voltages above said predetermined threshold potential.

4. A circuit arrangement for producing a time reference pulses as defined in claim 1, and wherein
   a time delay circuit is interposed in the lead to the base electrode of said other transistor
   for reference on the leading edge of said input pulse.

5. A circuit arrangement for producing a time reference pulse as defined in claim 4, and wherein
   said pair of transistors are of the same conductivity type.

6. A circuit arrangement for producing a time reference pulse as defined in claim 5, and wherein
   a discharge switch is connected across the electrodes of said capacitor, and
   means are connected between said discharge switch and the collector electrode of said other transistor for discharging said capacitor.

7. A circuit arrangement for producing a time reference pulse as defined in claim 5, and incorporating
   a further transistor having emitter and collector electrodes connected individually to the electrodes of said capacitor and a base electrode, and
   means applying the collector electrode of said other transistor to the base electrode of said further transistor,
   for discharging said capacitor in response to the pulse output at the collector electrode of said other transistor.

8. A circuit arrangement for producing a time reference pulse, as defined in claim 1, and incorporating
   a push-pull amplifier having an input and an output,
   means for applying said input pulse signal to the input of said amplifier,
   dual transistor emitter follower circuits coupled to the output of said amplifier and having
   a common emitter impedance element across which unidirectional pulses appear corresponding to both positive and negative input pulses, and
   means connecting said impedance element to said attenuator and to the base electrode of said other transistor.

9. A circuit arrangement for producing a time reference pulse in response to an input pulse varying in amplitude and shape comprising,
   a capacitor having two electrodes,
   means connecting one of said electrodes to a point of fixed reference potential,
   a pair of transistors of opposite conductivity type, each having emitter, base and collector electrodes,
   means connecting the emitter electrodes of both of said transistors to the other electrode of said capacitor,
   means applying direct energizing potential across said transistors in series,
   an attenuator, having input and output terminals,
   means for applying an input pulse signal to the input terminal of said attenuator for deriving a predetermined fraction of said input pulse signal at the output terminal of said attenuator,
   means connecting the output terminal of said attenuator to the base electrode of one of said transistors for charging said capacitor on the leading edge of said input pulse to a value substantially equal to said predetermined fraction of the peak voltage of said input pulse signal, at which value said one transistor ceases conducting, and
   means applying the full input pulse signal to the base electrode of the other of said pair of transistors at which said other transistor begins to conduct at the value of said input signal equaling the charge on said capacitor,
   thereby producing a pulse at the collector electrode of said other transistor indicative of the timing of said input pulse with respect to the trailing edge thereof.

10. A circuit arrangement for producing a time reference pulse in response to an input pulse varying in amplitude and shape comprising,
   a capacitor having two electrodes,
   means connecting one of said electrodes to a point of fixed reference potential,
   a pair of transistors of the same conductivity types, each having emitter, base and collector electrodes,
   means connecting the emitter electrodes of both of said transistors to the other electrode of said capacitor,
   means applying direct energizing potential to the collector electrodes of said transistors,
   an attenuator, having input and output terminals,
   means for applying an input pulse signal to the input terminal of said attenuator for deriving a predetermined fraction of said input pulse signal at the output terminal of said attenuator,
   means connecting the output terminal of said attenuator to the base electrode of one of said transistors for charging said capacitor on the leading edge of said input pulse to a value substantially equal to said predetermined fraction of the peak voltage of said input pulse signal, at which value said one transistor ceases conducting,
time delay means, and
means connecting said time delay means for the full input pulse signal to the base electrode of the other of said pair of transistors at which said other transistor begins to conduct at the value of said input signal equaling the charge on said capacitor,
thereby producing a pulse at the collector electrode of said other transistor indicative of the timing of said input pulse with respect to the leading edge thereof.

11. A circuit arrangement for producing a time reference pulse in response to an input pulse varying in amplitude and shape comprising,
a capacitor having two electrodes,
means connecting one of said electrodes to a point of fixed reference potential,
a pair of transistors of the same conductivity types, each having emitter, base and collector electrodes,
means connecting the emitter electrodes of both of said transistors to the other electrode of said capacitor,
means applying direct energizing potential to the collector electrodes of said transistors,
an attenuator, having input and output terminals,
means for applying an input pulse signal to the input terminal of said attenuator for deriving a predetermined fraction of said input pulse signal at the output terminal of said attenuator,
means connecting the output terminal of said attenuator to the base electrode of one of said transistors for charging said capacitor on the leading edge of said input pulse to a value substantially equal to said predetermined fraction of the peak voltage of said input pulse signal, at which value said one transistor ceases conducting,
time delay means,
means connecting said time delay means for the full input pulse signal to the base electrode of the other of said pair of transistors at which said other transistor begins to conduct at the value of said input signal equaling the charge on said capacitor,
a pulse inverting circuit coupled to the collector electrode of said other transistor,
a further transistor having collector and emitter electrodes connected individually to the electrodes of said capacitor and a base electrode, and
means coupling the output of said inverting circuit to the base electrode of said further transistor,
thereby producing a pulse at the output of said inverter indicative of the timing of said input pulse with respect to the leading edge thereof.

References Cited by the Examiner

UNITED STATES PATENTS

| | | | |
|---|---|---|---|
| 2,540,512 | 2/1951 | Crosby | 329—107 |
| 2,864,961 | 12/1958 | Lohman et al. | 307—88.5 |
| 3,188,574 | 6/1965 | Parmer | 307—88.5 |

References Cited by the Applicant

UNITED STATES PATENTS

| | | |
|---|---|---|
| 2,924,812 | 2/1960 | Merritt. |
| 3,004,174 | 10/1961 | Seidman. |
| 3,064,243 | 11/1962 | Thompson. |
| 3,102,237 | 8/1963 | Elliott. |

ARTHUR GAUSS, *Primary Examiner.*

J. HEYMAN, *Assistant Examiner.*